Figure 1:
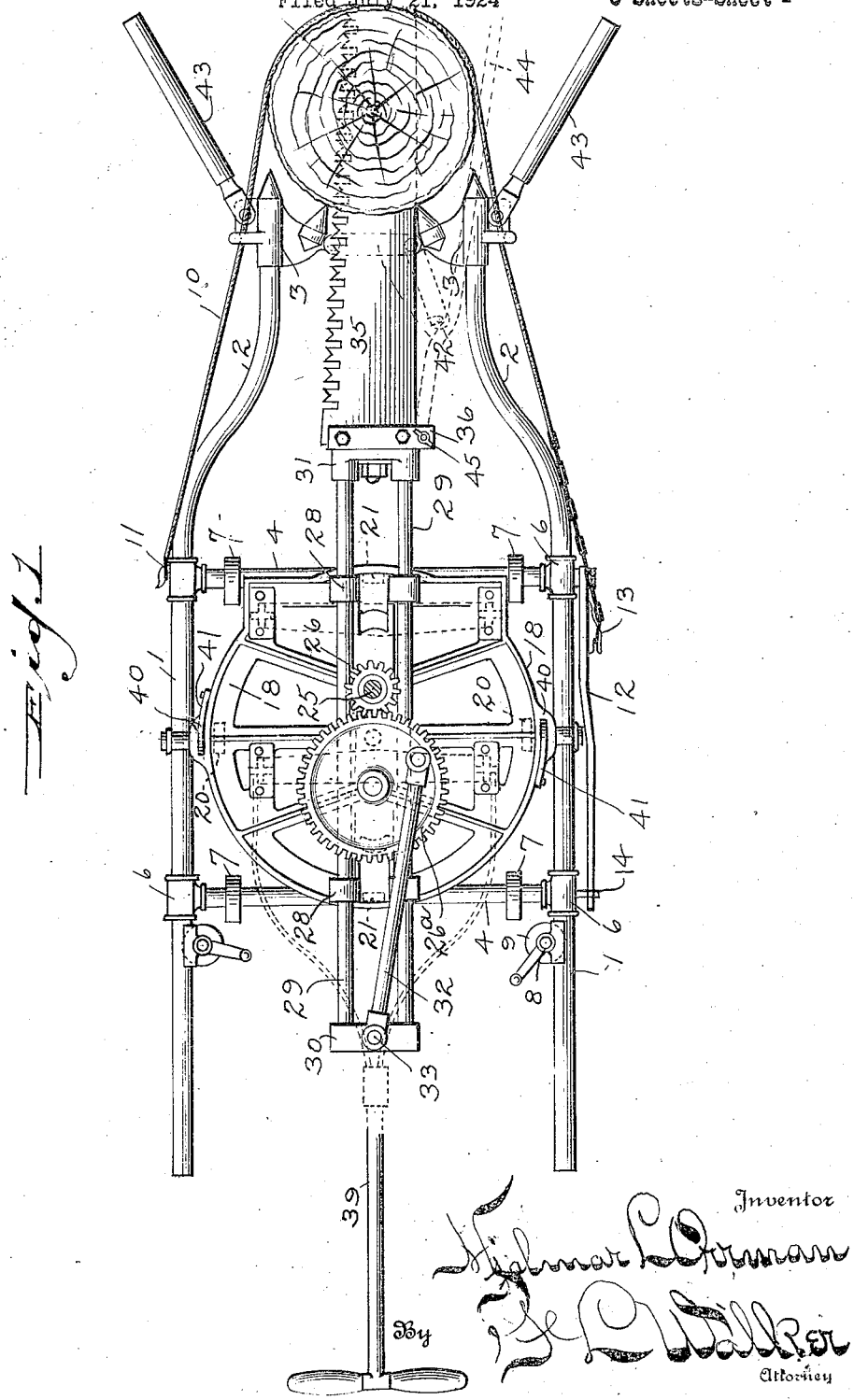

Dec. 20, 1927.  
H. L. ORRMAN  
1,653,060  
TREE FELLING MACHINE  
Filed July 21, 1924  
3 Sheets-Sheet 1

Inventor  
Hjalmar L. Orrman  
By  
Attorney

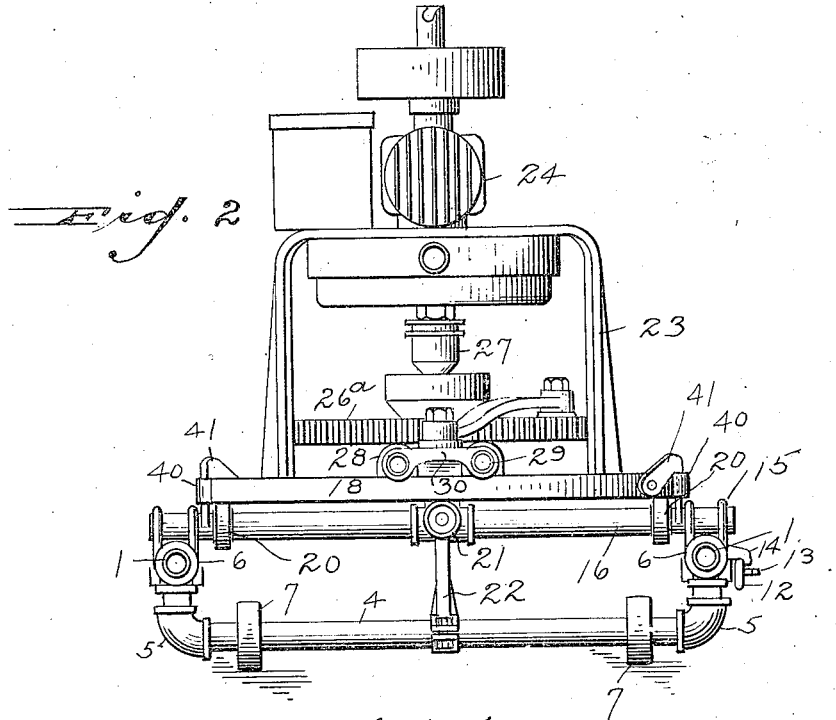
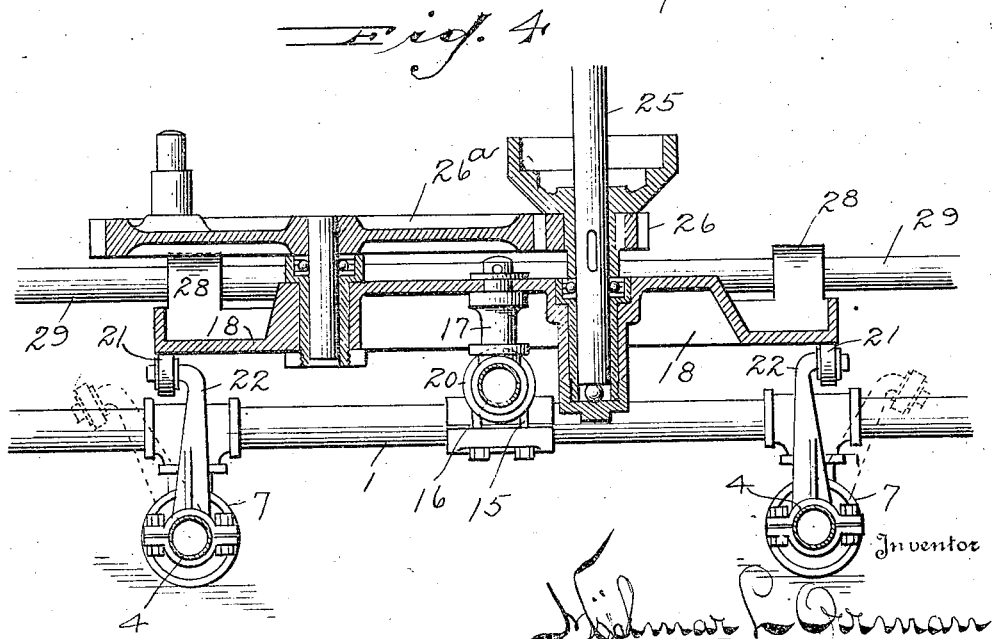

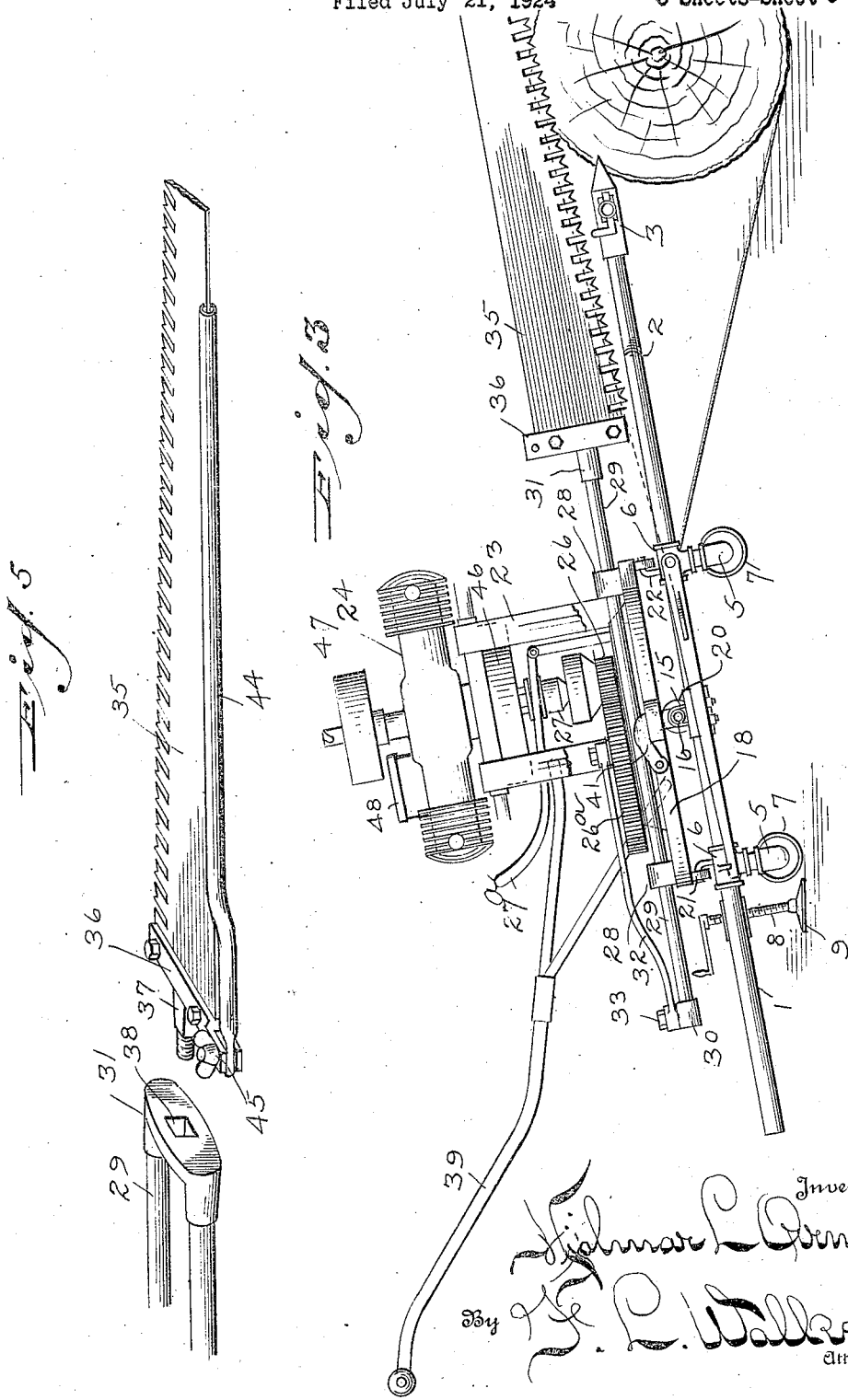

Patented Dec. 20, 1927.

1,653,060

UNITED STATES PATENT OFFICE.

HJALMAR L. ORRMAN, OF DAYTON, OHIO.

TREE-FELLING MACHINE.

Application filed July 21, 1924. Serial No. 727,388.

My invention relates to tree felling machines and more particularly to a portable power operated saw.

In the present invention there is contemplated a self contained unit of the litter type, comprising a light but strong carrying frame having handles at its opposite ends, on which is mounted a light weight air cooled explosive engine, driving through suitable clutch and gear connection, a reciprocatory cross head mounted upon a turn table capable of to and fro rotary movement in the plane of such table, and also capable of to and fro tilting movement, about a transverse axis, the saw being engageable with the reciprocatory cross head, in either of two positions perpendicular to each other, enabling it to saw horizontally through a standing tree and close to the base, or to be employed as a cross cut saw for dividing the fallen trees into sections. The saw is progressively fed in the first mentioned position of use by the oscillatory movement of the turn table about its perpendicular axis, and in the second mentioned instance by the tilting movement of the table about its transverse axis. The saw is initially supported against drooping when employed in a horizontal position by a detachable back brace, which is automatically disengaged as the saw enters sufficiently deep to be supported in its kerf.

The object of the invention is to provide a unitary portable power operated saw, which will not only be simple and cheap in construction, but will be more efficient in use, positive in operation, uniform in action and unlikely to get out of repair.

A further object of the invention is to provide a self contained unit, which will be well balanced for easy transportation from place to place.

A further object of the invention is to provide improved means for actuating the saw and for progressively advancing the saw during operation, whether it be operating vertically or horizontally.

A further object of the invention is to provide improved means for mounting the actuating motor, and to provide means for interchangeably mounting the saw blade for vertical or horizontal operation in conjunction with the means for feeding the saw in either direction.

With the above primary and other incidental objects in view, as will more fully appear in the specification, the invention consists of the features of construction, the parts and combinations thereof, and the mode of operation or their equivalents as hereinafter described and set forth in the claims.

Referring to the drawings, wherein is shown the preferred but obviously not necessarily the only form of embodiment of the invention, Fig. 1 is a top plan view of the portable saw mechanism forming the subject matter hereof, with the overlying motor or engine and its support removed. Fig. 2 is an end elevation and Fig. 3 a side elevation of the assembled machine. In Fig. 3, however, the machine is shown set for cross cut sawing, whereas in Fig. 1 it is shown set for horizontal sawing for tree felling purposes. Fig. 4 is an enlarged detail sectional view of the adjustable turn table carrying the reciprocatory cross head and mounting. Fig. 5 is a detail perspective view of the interchangeable saw connection.

Like parts are indicated by similar characters of reference throughout the several views.

The driving motor and saw operating mechanism is mounted upon a carrying frame or litter, which for combined rigidity, strength and lightness, is preferably though not necessarily, constructed from standard pipe and pipe fittings. This litter or carrying frame comprises side members 1—1 formed from interconnected pipe sections or steel tubing with welded couplings, the members being inbent adjacent to one end as at 2. Each member carries at such inbent end a spurred head 3 for anchorage engagement upon the tree or log to be sawed. These side members 1—1 are interconnected by transverse tie members 4—4, which, however, are located in dependent position below the level of the side members 1, to which they are connected by elbow and T couplings 5 and 6. The depression of the tie members 4 below the level of the lateral carrying members 1 affords clearance for the tilting movement of the turn table to be described. Mounted in spaced relation upon the transverse tie members 4 are small carrying wheels or rollers 7, which facilitate the advance of the structure into engagement with a tree or log to be sawed, and which further enable easy transportation over level surfaces. As a means of stationarily supporting the structure while in use, a pair of screw jacks 8 having swivelly connected bases or feet 9 are mounted on the side members 1. The frame is immovably held when in use in engagement with the tree trunk and with its spurred head 3 embedded therein, by means of a tie or cable 10 attached at 11 to one side of the carrying frame or litter passing thence about the tree trunk operated upon and having its opposite end connected with a lever 12, by which the cable may be placed under tension or drawn taut. For this purpose the cable is preferably provided with a short length of chain, the links of which are engageable over a hook or finger 13 upon the lever 12, the lever in turn being engageable in operated position beneath a stop finger 14, projecting laterally from the main frame.

Mounted in suitable bearings upon the carrying frame or litter in the present instance in clevises 15 is a transverse rock shaft 16, having thereon a medially disposed upstanding stud or spindle 17. Journaled upon the spindle 17 is a turn-table 18, upon which is mounted the driving motor and operating mechanism. This turn-table 18 normally rests upon a series of rollers, two of which rollers 20 are located upon the transverse rock shaft 16, while two additional transversely disposed rollers 21 are carried by swinging arms 22 mounted upon the transverse tie members 4. The bearing rollers 20 and 21 engage the underside of the turn table 18, supporting such turn-table in its rotary movement about its central trunnion stud 17. While permitting the revoluble or oscillatory movement in the plane of the turn table, the bearing rollers 21 prevent any tilting movement of the table about its rock shaft 16. However, by swinging the supporting arm of the rollers 21 downwardly out of engagement with the turn table, the latter may be tilted or rocked in a fore and aft direction. Mounted upon standards 23 carried by the turn table 17 is the driving motor 24. In the present instance this motor is a hydro-carbon engine of the opposed cylinder type, that is, having two cylinders, arranged in axial alignment one to the other, on opposite sides of the crank shaft. The cylinders are air cooled. The lower end of the main drive shaft 25 is journaled in the turn table 17 and carries a driving pinion 26 operatively connected by a suitable clutch 27, controlled by the clutch lever 27ª. The clutch may be of any suitable type, preferably a friction clutch. This clutch serves to connect and disconnect the driving pinion 26 with the motive power. The pinion 26 intermeshes with a drive gear 26ª also mounted upon the turn table 17. Located on opposite sides of the turn table 17 are guide bearings 28 in which reciprocates a cross head comprising two parallel shafts 29 extending in opposite directions beyond the turn table 17 and interconnected at their ends by yokes 30 and 31. The main driving gear 26ª carries a wrist pin, which is connected by a pitman 32, with the stud 33 carried by the yoke 30, at the rearward end of the cross head. As the motor is operated driving the pinion 26 the gear 26ª is rotated at reduced speed, transmitting reciprocatory motion through the pitman to the shafts 29 comprising the cross head and to which is connected the saw blade. The yoke 31 at the forward end of the cross head is provided medially with a polygonal socket. In this instance the socket is square. Obviously a socket having a key way might be employed in lieu of the polygonal shape. The saw blade 35 is of the usual cross cut saw type. The butt end of the blade is provided with a head 36, from which projects rearwardly a shank 37 corresponding with the recess or socket 38 in the forward yoke 31. By providing the square shank 37 for engagement in the square socket 38 of the yoke, the saw blade may be positioned in different planes, or turned in different directions. In Fig. 1 the blade has been shown as extending in a plane parallel with the plane of the turn-table, whereas in Fig. 3 the blade is shown turned in a vertical plane. It is obvious that the direction of the saw blade may be reversed and in felling trees, as shown in Fig. 1, the saw may be fed toward the right or toward the left, as found more convenient. This feeding motion of the saw to advance it into the work is effected by oscillating the turn table 17 and with it the motor, the cross head and connecting parts. To afford such control, a handle lever 39 is provided projecting upwardly and rearwardly and connected at its lower forward end to the turn-table 17, and to the struts or standards supporting the motor. By means of this handle lever 39, the operator may swing the saw blade to and fro in a lateral direction and feed it into the tree being cut, as fast as its progress will permit. Likewise when the bearing rollers 21 of the turn-table are disengaged by turning their supporting arms downwardly, the same lever 39 is employed to control the fore and aft tilting movement of the table and with it the saw operated in such case in a vertical plane to sever the fallen tree trunk as shown in Fig. 3. In order to maintain the saw in properly alined relation during such cross cut operation, and prevent the oscillation of the turn table 17, the latter is provided with slotted ears 40 on opposite sides through which detent arms 41, pivotally mounted upon the table, engaged with the transverse member 16 of the main frame, to lock the turn table against oscillatory movement while permitting its to and fro tilting motion. To afford rigidity and brace the main frame when the device is being used for felling trees, the heads 3 of the carrying frame members 1 are inter-connected by a detachable link 42. However, when the saw is employed in a vertical position as shown in Fig. 3 such link 42 is disengaged and swung laterally out of the path of operation of the saw as shown by dotted lines in Fig. 1. For convenience in transporting the machine from place to place by carrying it the forward ends of the frame members 1—1 are provided with handle arms 43, pivoted to the spur heads 3 as shown in Fig. 1. The structure is of such weight and so balanced that two men, one of whom grasps the rear end of the side members 1 and the other grasping the pivoted handle arms 43 may easily and readily carry the saw from place to place.

Since a comparatively long saw blade 35 is required for general use, the weight of which when used in a horizontal plane for felling trees will cause the blade to droop a temporary stiffening support is employed. To this end a length of pipe 44 is longitudinally slotted on one side. One end of this pipe support is flattened for engagement in the saw head 36 where it is detachably clamped by a set screw 45. When the tree felling operation is initially started the back of the saw is inserted in the longitudinal slot of the supporting member 44, which is in turn engaged in the saw head 36. The outer end of such support may be yieldingly clamped upon the saw blade if desired. This supporting member serves to stiffen and hold the saw blade in alignment until it has entered the tree trunk forming a kerf, by which it is subsequently supported and guided. As the saw enters the trunk of the tree to such extent that the supporting member 43 enclosing the rear margin of the saw comes in contact with the tree trunk, the support is forced out of the yielding engagement with the saw blade, and diverted as shown by dotted lines in Fig. 1, while the saw blade continues to advance through the trunk of the tree. Any suitable type of motor, preferably of the explosive type may be employed. In the present instance the fly wheel 46 of the motor is provided with vanes or wings radially disposed therein, affording a blower fan action by which air currents are induced across the finned cylinder of the engine. The magneto 47 which affords an auxiliary fly wheel action in the present instance is mounted above the motor upon the main shaft, the extremity of which is provided with clutch teeth for the engagement of a starting crank. A fuel tank 48 is mounted upon the superstructure adjacent to the motor.

From the above description it will be apparent that there is thus provided a device of the character described, possessing the particular features of advantages before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprises the preferred form of several modes of putting the invention into effect and the invention is, therefore, claimed in any of its forms or modifications within the legitimate and valid scope of the appended claims.

Having thus described my invention, I claim:

1. A portable saw wherein a reciprocatory saw blade and an actuating motor therefor are carried by an adjustable table capable of both rotary and tilting movement, characterized by carrying frame of tubing, including longitudinally disposed tubular side members, and transverse connecting tubular members, disposed below the plane of the longitudinal side members and connected thereto by upturned ends, swinging arms pivoted upon the transverse members beneath the table, guide rollers carried by said arms, normally engaging the under side of said table to guide the table in its rotary movement and preventing tilting movement thereof, said rollers being withdrawn from their engagement with the table by the swinging movement of said arms.

2. A portable saw wherein a reciprocatory saw and a power unit therefor are mounted upon an adjustable table capable of rotary and tilting movement independent of a main carrying frame upon which the adjustable table is mounted, characterized by swinging detent arms operatively connecting the table and frame in a predetermined position of relative adjustment for locking the table against rotary movement while permitting rocking movement of the table relative to the main carrying frame.

3. In a power sawing machine, a main frame, a power unit, a table mounted upon the main frame for rotary and tilting movement, relative to the main frame bearing rollers upon which the table rests for rotary movement, vertically swinging arms carrying the bearing rollers at diametrically opposite positions on opposite sides of, and substantially perpendicular to the axis upon which the table tilts by which the support of such rollers may be withdrawn from the table thereby permitting tilting movement of the rotary table, a reciprocatory cross head carried by the table and actuated by the power unit and a saw blade carried by the cross head.

4. In a power sawing machine, a main frame, a power unit, a rotary table mounted upon the main frame and capable of tilting movement relative thereto independent of its rotary movement, detents carried by the table and engageable with the main frame to lock the table against rotary movement while permitting tilting movement thereof independent of the main frame, a cross head carried by the table and having operative engagement with the power unit, and a saw blade carried by the cross head.

5. In a portable sawing machine, a power unit, a reciprocatory cross head operatively connected with the power unit, a pivoted mounting for the cross head, a saw blade carried by the cross head, and a carrying litter therefor comprising spaced side rails, transverse tie members connecting the side rails, spur heads for engagement with the work carried at the extremities of the spaced side rails, and a swinging link detachably connecting the spur heads one to the other.

6. In a portable sawing machine of the character described, a main frame, comprising side rails and transverse connecting ties, the cross ties being depressed below the plane of the side rails, rollers journaled intermediate the side rails, upon the depressed portions of the transverse ties, a table capable of both rotary and tilting movement mounted upon the frame, arms journaled upon the depressed portions of the transverse ties, rollers carried by said arms engaging the under side of said table and supporting and guiding the table in its rotary movement, said rollers normally preventing the tilting of the table but movable from engagement therewith by swinging movement of the arms about their journal connections upon the ties to permit tilting movement of the table, a reciprocatory saw, and saw actuating mechanism mounted upon the table.

7. In a portable sawing machine, a main frame, a table mounted thereon for both rotary and tilting movement relative to the main frame, means for locking the table in a predetermined position of rotary adjustment regardless of the degree of tilting adjustment of the table, a sliding cross head carried by the table, a motor carried by the table, power transmission mechanism also carried by the table for translating the rotary motion of the motor into reciprocatory motion of the cross head, a clutch device intermediate the motor and transmission mechanism thereby enabling the motor to be started independent of the saw mechanism and operated idly, and a saw blade engageable with the reciprocatory cross head.

In testimony whereof I have hereunto set my hand this 7th day of July, A. D. 1924.

HJALMAR L. ORRMAN.